United States Patent [19]

Berger et al.

[11] Patent Number: 4,575,261

[45] Date of Patent: Mar. 11, 1986

[54] SYSTEM FOR CALCULATING FORMATION TEMPERATURES

[75] Inventors: Eugene L. Berger; Richard A. Koseluk, both of Houston, Tex.

[73] Assignee: NL Industries, Inc., New York, N.Y.

[21] Appl. No.: 509,484

[22] Filed: Jun. 30, 1983

[51] Int. Cl.$^4$ ............... G01K 13/00; G05B 17/00
[52] U.S. Cl. ............................. 374/136; 73/154; 374/170; 340/870.17; 364/422
[58] Field of Search ............... 374/136, 169, 134; 73/154; 340/870.17; 364/421, 422

[56] References Cited

U.S. PATENT DOCUMENTS

| | | | |
|---|---|---|---|
| 2,818,732 | 1/1958 | Bennett | 340/870.17 X |
| 3,122,016 | 2/1964 | Fordham | 73/154 |
| 3,280,312 | 10/1966 | Sandelien | 374/169 X |
| 3,327,527 | 6/1967 | Arps | 73/154 |
| 3,455,158 | 7/1969 | Richter, Jr. et al. | 73/154 |
| 3,745,822 | 7/1973 | Pierce et al. | 73/154 |
| 3,807,227 | 4/1974 | Smith, Jr. | 73/154 |
| 3,877,307 | 4/1975 | Georgi | 374/169 |
| 3,878,724 | 4/1975 | Allen | 374/134 X |
| 4,314,339 | 2/1982 | Kenyon | 364/422 |
| 4,340,934 | 7/1982 | Segesman | 364/422 |
| 4,350,979 | 9/1982 | Eberwein | 364/422 X |
| 4,507,735 | 3/1985 | Moorehead et al. | 364/422 |

Primary Examiner—Daniel M. Yasich
Attorney, Agent, or Firm—Carl O. McClenny; William E. Johnson, Jr.

[57] ABSTRACT

Determination of drilling mud thermal conductivity for estimation of earth formation temperature through a well bore thermal model. Borehole annulus and drill pipe bore temperature measurements are taken over a relatively short period of time when circulation of drilling mud is interrupted and temperature differentials maximized. The dynamic temperature response characteristics related to the heat transfer and storage parameters of the drill pipe, mud and bit are integrated into a mathematical borehole model incorporating the thermal resistance, heat capacity, and heat generation of the mud and drill pipe and the drill bit. The maximum temperature differential is then determined and the response characteristics used to establish the requisite parameters for the thermal conductivity and temperature calculations. In this manner, formation temperatures can be estimated to monitor downhole mud behaviour and geothermal gradients.

8 Claims, 6 Drawing Figures

SYSTEM FOR CALCULATING FORMATION TEMPERATURES

BACKGROUND OF THE INVENTION

1. Field of the Invention

The invention relates to a method and apparatus for estimating well bore formation temperature by measuring the temperatures of the drilling mud within the drill string and in the annulus of the borehole and, more particularly, the determination of formation temperature and mud thermal conductivity by establishing a well bore thermal model.

2. History of the Prior Art

It has long been recognized in the oil industry that the collection of downhole data during drilling is of extreme value. Such information as to downhole environmental parameters aids in locating specific earth formations. Moreover, it improves the efficiency of the drilling operation by providing a "feed back" as to in situ temperature, volume, viscosity, resistivity and pressure conditions. This information often mandates modifications in the drilling operation. For example, the drilling mud consistency is directly affected by the cuttings from the drill bit. Thus, efficient drilling requires proper selection and maintenance of drilling fluid characteristics and the viscosity and flow rate of the mud is often varied in response to downhole conditions. The value of mud thermal conductivity is another parameter which is useful in mud selection and in controlling the mud flow behavior at the bit.

Certain downhole data is both useful from an efficiency point and may serve as a warning to prevent dangerous situations from arising. Downhole formation temperature is one such parameter. For example, an ever present danger in the drilling of a borehole is encountering earth formations which contain high pressure fluids such as gas or hot salt water. When a gas zone is penetrated, the high pressure fluids from the formation enter the borehole and displace the drilling mud back up the borehole toward the drilling rig at the surface. If the penetration of a high pressure formation and the ensuing direct intrusion of high pressure fluids back into the borehole is not detected quickly, for example, by a sudden temperature change, and controlled, it can result in the complete displacement of the drilling mud back up the borehole. This even results in the expulsion of the high pressure fluids out of the top of the borehole and is called a "blow out". A blow out can result in great injury to both property and life due to the high combustibility of the gas and other fluids egressing from a well bore and the violence with which they exit.

On the other hand, it is possible that, during drilling, a borehole may enter a formation which is highly porous and create a tendency for all of the drilling mud to flow freely from the borehole into the porous formation. This event is termed "lost circulation" and can result in the substantial loss of drilling fluids if the lost circulation is not detected very rapidly and preventive measures taken. Preventive action is needed upon the detection of an earth formation from whence such an event might be likely. It is thus desirable to detect such a formation as rapidly as possible in order to take the requisite remedial action to control mud flows. The accurate and rapid measurement of the formation temperatures along the borehole would enhance the aforesaid detection efforts as well as provide much needed data for locating specific earth formations.

The measurement of earth formation temperature in a measuring while drilling mode has been proven to be a difficult and costly endeavor. One technical problem of concern is the number of variables which are involved. One such variable is the thermal conductivity of the drilling fluid which changes constantly. The value of thermal conductivity, itself, is a useful parameter for enhancing the selection of drilling fluids as well as providing a vital link in the determination of formation temperature. With such data and proper extrapolations therefrom, abnormally pressured formations can be predicted and anticipated. Abnormally high pressured formations will induce a higher than normal formation temperature gradient. Such information would obviously be extremely valuable.

It is well known to "survey" the temperature of the drilling mud in a borehole to detect a "blow-out", "wash-out", a locked bit and indirectly the porosity and fluid content of the formation. A substantial increase in the temperature of mud can indicate the presence of hot salt water. A sudden decrease in the temperature of the mud can indicate the presence of the cooling effect of expanding gas. Such data does not, however, directly indicate the temperature of the earth formation around the borehole, because it has only been possible to make such measurements of the mud itself and not the formation in a measuring while drilling mode. For example, U.S. Pat. No. 3,327,527 (Arps) discloses a system for measuring the thermal gradients in drilling mud down in the borehole where the event in issue actually occurs. Temperatures of the mud are taken inside the drill collar and in the annulus of the borehole. This information is telemetered back to the well head and used to determine the presence of heat gain and heat loss to indicate both hazardous conditions and, indirectly, the character and drillability of the formation. It is well known that without further information, such readings do not indicate the actual temperature of the formation with any accuracy.

In actual practice the process is not as obvious as disclosed by Arps. Only recently, 1984, have effective downhole temperature measurements been made by measurement-while-drilling equipment. The thermal variations due to bit conditions, formation inconsistencies, bit motion which causes erratic fluid motion, and very high flow rates in modern day drilling practices, yield several conditions which make the teachings of Arp unuseful.

First, the high flow rates make the temperature differential along the annulus very small, and indicates that the temperature difference expected over the bottom 100 foot interval is less than 1°. This means that the estimation of the formation thermal conductivity taught by Arps is dependent upon an extremely small temperature difference. These thermal variations are masked by the thermal variations caused by the bit dynamics. The varying weight on the bit and the microscopic variations in formation hardness creates variation in drilling energies which create heat input to the drilling mud. These variations which can easily result in a few degrees of temperature variation, easily mask the thermal conductivity changes of the formation. These variations must be overcome by discrimination or compensation. Methods which accomplish this are not obvious, since these problems were not obvious to Arps.

The problem can be approached from an unique approach; that is from measuring temperature variations across the drill pipe when the drilling is stopped every 30 feet to add drill pipe. Other prior art approaches address that goal.

A prior art approach to determining earth formation temperature is the measurement of the ambient temperature at the drill bit with the drilling operation interrupted. For example, U.S. Pat. No. 3,455,158 (Richter, et al) sets forth apparatus for logging the temperature of a drill bit, drilling mud and earth formation. A temperature transducer is mounted directly in the drill bit for this purpose. The bit engages the earth formation and thus may reflect the temperature thereof once the effect of drilling mud is eliminated. Unfortunately, the time necessary for the downhole thermal conditions to sufficiently stabilize for an accurate "ambient" reading is several hours. This factor alone prevents the system from being widely used to determine earth formation temperature because it is not cost effective to repeatedly interrupt drilling for such long periods of time.

It is recognized that the drilling mud itself does reflect certain downhole thermal and geophysical conditions. Either the downhole temperature or surface temperature of the returning mud flow can indicate abrupt changes of temperature of the magnitude encountered prior to penetration of high pressure formations. Moreover, the cuttings returning in the mud are a good indication of the formation density. One such technique is set forth in U.S. Pat. No. 3,701,388 wherein the drilling fluid temperature is measured at the surface to detect such zones and prevent lost circulation and blowout of the well. Such temperature measurements are made without regard to the thermal conductivity of the fluids and materials involved. For this reason, a determination of the actual formation temperature is not realistically offered or even suggested by the telemetered data. It is the quantitative change which alerts the operator, not qualitative information such as actual formation temperature.

It would be an advantage to accurately estimate earth formation temperature by downhole sensors without having to wait hours for the downhole ambient temperature to stabilize. The present invention overcomes the aforementioned prior art problems by providing a well bore thermal model incorporating the heat generation, heat transfer and heat storage parameters of the drill pipe, mud and bit. Borehole annulus and drill pipe temperature measurements are taken by downhole sensors over a relatively short time frame during which temperature differentials maximize. In this manner, drilling mud thermal conductivity can be calculated and earth formation measurements estimated in a single time span prior to thermal stabilization.

SUMMARY OF THE INVENTION

The present invention relates to a method of determining drilling mud thermal conductivity and earth formation temperature. More particularly, one aspect of the invention includes a method of and apparatus for determining the earth formation temperature while drilling a borehole comprising the steps of pumping drilling fluid into the borehole through drill pipe to transfer heat to the fluid from earth formations as they are exposed by the drill bit. The temperatures of the fluid inside the drill pipe and borehole annulus are measured. The flow of fluid inside the drill pipe is then interrupted preferably in the presence of float valves to prevent backflow of fluids into the pipe, drilling is interrupted (such as when normally adding another joint of drill pipe) and the temperatures of the fluid are measured during the interruption of flow. The thermal conductivity of the fluid is then determined as a function of the temperature differential of the fluid in the pipe and the annulus and the cessation of heat generation at the bit. The earth formation temperature in the borehole is then estimated as a function of the fluid thermal conductivity, the temperature differential of the fluid in the pipe and the annulus, a thermal model of the heat storage and heat transfer characteristics of the drill pipe, the drilling mud and the formation cuttings, and the cutting and fluid flow caused by vertical thermal gradients in the annulus.

In another embodiment of the invention, the step of measuring the temperatures of the fluid includes providing a first temperature sensor inside the pipe and a second temperature sensor outside the pipe in the vicinity of the drill bit. The step of determining the thermal conductivity of the fluid also includes the step of calculating a capacitance relationship between the thermal resistivity of the fluid and steel and the heat capacity of the fluid and steel. The step of calculating the capacitance relationship preferably includes the step of determining the ratio of fluid resistivity and steel capacitance to fluid capacitance and steel resistivity.

In yet another embodiment, the invention includes the step of determining the earth formation temperature, as set forth above, by establishing the maximum temperature differential of the fluid in the pipe and annulus following the step of interrupting the flow, preferably in the presence of float valves. The step of determining the earth formation temperature then includes the step of calculating an annulus relationship between the radius of the pipe, its heat transfer coefficient, the radius of the borehole and the thermal conductivity of the fluid. The step of calculating the annulus relationship includes the step of determining the ratio of pipe radius and its heat transfer coefficient to borehole radius and fluid thermal conductivity. The step of establishing the maximum fluid temperature differential includes calculating the ratio of the maximum temperature differential to the radius of the borehole and fluid thermal conductivity to pipe radius and its heat transfer coefficient.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
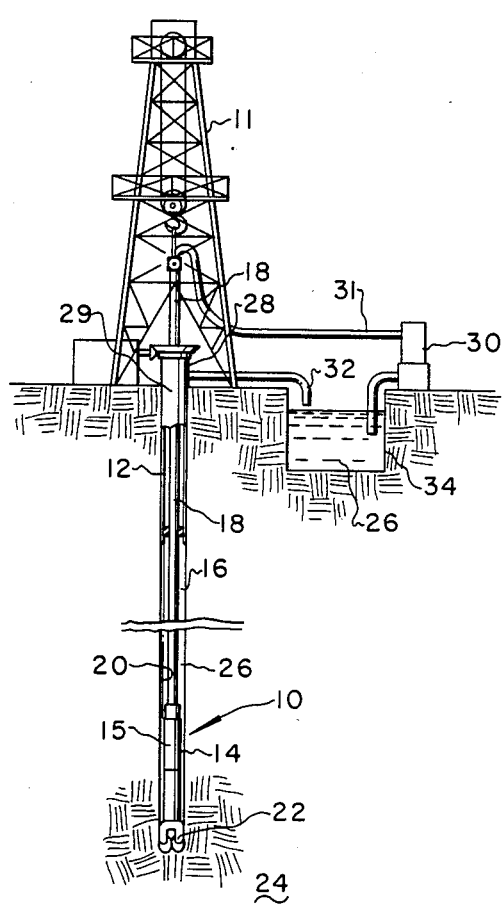
FIG. 1 is a diagrammatic, side-elevational view of a borehole drilling operation illustrating the determination of earth formation temperature and drilling mud thermal conductivity in accordance with the principles of the present invention.

Referring first to FIG. 1, there is shown a drilling rig 11 disposed atop a borehole 12. A first embodiment of a system 10 for calculating formation temperature is carried by a sub 14 comprising a portion of drill collar 15 and disposed within the borehole 12. The system 10 is provided for thermal measurements of the mud in the borehole. Temperature readings are taken of the mud flowing within the annulus 16, defined as the region between drill string 18 and borehole sidewalls 20 as well as mud within the central annular passageway through the string itself. A drill bit 22 is disposed at the lower end of the drill string 18 and carves the borehole 12 out of the earth formation 24 while drilling mud 26 is pumped from the well head 28. Metal surface casing 29 is shown to be positioned in the borehole 12 above the drill bit 22 for maintaining the integrity of the borehole 12 near the surface. As described below, the present invention permits accurate calculations of formation temperature in a measuring while drilling (MWD) configuration.

The annulus 16 between the drill string 18 and the wall 20 creates a "theoretically closed" return mud flow path. Mud is pumped from the well head 28 by a pumping system 30 through mud supply line 31 coupled to the drill string 18. Drilling mud is, in this manner, forced down the central axial passageway of the drill string 18 and egresses at the drill bit 22 for carrying cuttings comprising the drilled sections of earth, rock and related matter upwardly from the drill bit to the surface. A conduit 32 is supplied at the well head for channeling the mud from the borehole 18 to a mud pit 34. The drilling mud is typically handled and treated by various apparatus (not shown) such as outgassing units and circulation tanks for maintaining select viscosity and consistency. The relative temperatures of the mud in the drill string 18 and the borehole annulus 16 is a function of many parameters which can provide much useful information. In accordance with the principles of the present invention, these temperatures may be measured during an interruption in the drilling operation to provide dynamic temperature response characteristics. This information in conjunction with a well bore thermal model permits determination of thermal conductivity of the drilling mud 26 and accurate estimation of the temperature of the formation 24. (See thermal condition studies by the Sandia National Laboratories "Advanced Wellbore Thermal Simulator GEOTEMP2", and Homes and Swift, Journal of Petroleum Technology, June 1970).

When the pumping of drilling fluids into the drill string is interrupted, the density of formation cuttings in the annulus tends to reverse the flow and cause fluids to move from the annulus back through the bit and into the drill pipe. The inclusion of float valves in the drill pipe just above the drill bit will prevent the hotter drilling fluids in the annulus from flowing back up the drill string. Also during the interruption of flow of fluids up the annulus, the formation cuttings suspended in the fluids in the annulus will tend to drift or slip back down through the fluid toward the bit. Thus, compensation must be made in the calculations for the thermal effects of these movements of the heated formation cuttings during the interruption of flow. Also, during the interruption of flow, the formation of cooler fluids above the bit will tend to fall replacing the lighter, hotter fluids close to the bit. Thus, compensation must be made in the calculations for the thermal effects of these movements of the annulus fluids. These compensations are accomplished by having the model allow heat removal by the circulation flow.

Still referring to FIG. 1, there is shown the sub 14 and drill collar 15 comprising a portion of the system 10 of the present invention in a downhole environment. The system 10 is constructed to generate a series of signals for telemetry to the well head 28 indicating borehole temperatures. This information is obtained from sensors disposed within the sub 14, as will be described in more detail below. The requisite telemetry, communication and analysis systems are, of themselves, deemed to be of conventional design, and are not specifically shown or described herein. The methods and particular apparatus necessary for the calculation of earth formation temperature and thermal conductivity of the drilling mud therein is, however, presented in detail and comprises the subject of the present invention.

Figure 2:
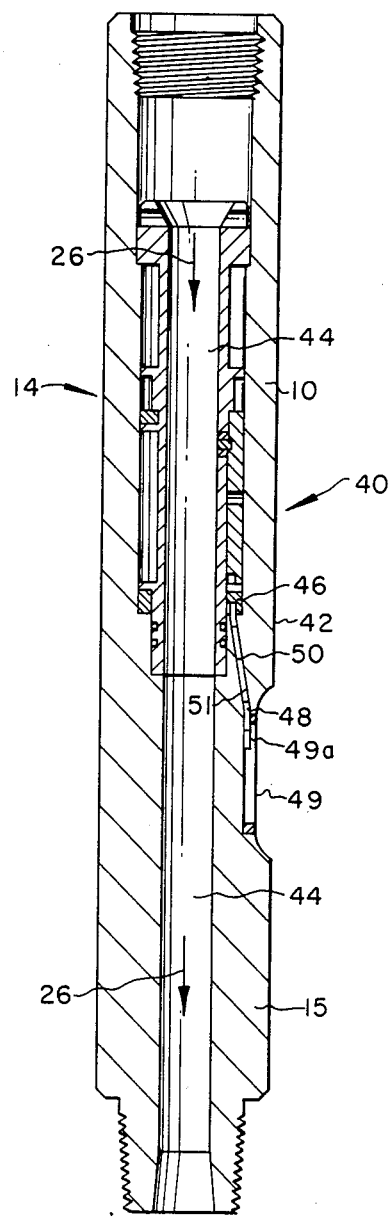
FIG. 2 is an enlarged, side-elevational, cross-sectional view of one embodiment of the drill collar of FIG. 1 incorporating means for measuring borehole and annulus mud temperatures.

Referring now to FIG. 2, there is shown an enlarged, side-elevational, schematic view of one embodiment of sub 14 containing a borehole thermal sensor system 40 constructed in accordance with the present invention. The sensor system 40 is mounted and insulated within the drill collar section 42 through which the drilling fluid or mud 26 is directed to pass. The drill collar 42 includes a central aperture 44 through which mud 26 flows downwardly to the bit 22 and preferably comprises a conventional MWD mud resistivity sub or a near-bit mechanics sub. The system 40 includes highly accurate inner and outer temperature transducers 46 and 48, respectively, or the like. It should be noted that the accuracy of measuring the difference between the bore and annulus temperature is most critical. A one (1) degree error may result in a fifty (50) degree error in the estimated formation temperature, as will be discussed below. Thus, the accuracy of the difference measurement should be less than one tenth (0.1) of one degree to provide accurate downhole data. The temperature transducer must therefore be carefully designed. U.S. Pat. No. 3,122,016 to Fordham teaches how to use a differential thermocouple to measure extremely small differential temperatures.

Still referring to FIG. 2, there is shown one embodiment of means for sensing the differential borehole temperatures. Outer temperature sensor 48 is disposed within a recess 49 and may be secured in elastomer 49A adjacent a conventional mud resistivity sensor (not shown). A connector cable 50 extends through passage 51 in the side wall of the drill collar 15. The cable 50 is coupled to sensor 46, likewise secured adjacent a conventional bore mud resistivity sensor (not shown). Again, elastomeric potting may be utilized to secure the sensors and seal the connections. The sensors 46 and 48 are radially disposed one from the other wherein the function of indicating the exact temperature differentials may be determined for time based analysis.

Figure 3:
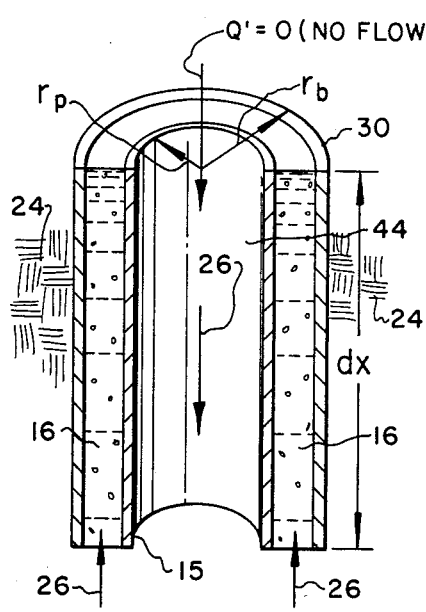
FIG. 3 is an enlarged, schematic, cross-sectional view of a section of the borehole annulus of FIG. 1 illustrating the construction of a well bore thermal model in accordance with the principles of the present invention.

Referring now to FIG. 3, there is shown a free-body thermal diagram of the drill string 18 and well bore 12 at the point of analysis where sensors 46 and 48 are positioned. The dynamic characteristics of the temperature are related to the heat transfer and storage parameters that cause the thermal measurements to lag the formation temperature. The heat transfer resistance is assumed, for purposes of this analysis, to be lumped as a single element. The energy storage is also assumed to be lumped as a single element. Such assumptions permit utilization of a classical differential equation solution.

Figure 4:
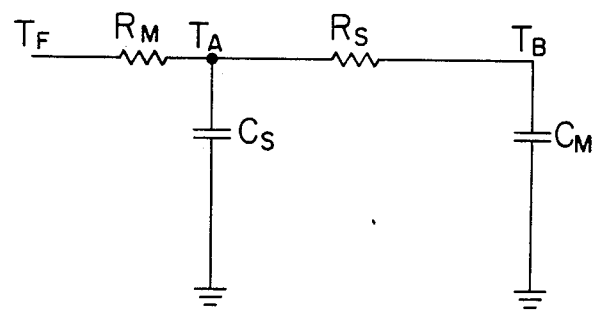
FIG. 4 is a schematic diagram of the thermal model of FIG. 3.

Referring now to FIG. 4, there is shown a schematic of the free-body of FIG. 3 in the form of a thermal schematic circuit diagram incorporating the resistance and capacitance of the mud and of the steel. The heat transferred from the flow of drilling mud (Q) equals zero when the mud flow is stopped. The heat transfer area of the free-body section of FIG. 3 is thus $2\pi r dx$, which defines the annular volume of the mud 26 in bore 44. The following nomenclature is thus incorporated for the schematic and calculations derived from FIG. 4.

$r_p$ = Drill pipe radius
$r_b$ = Drill bit radius
$C_s$ = Steel heat capacity
$R_s$ = Thermal resistance of steel
$C_m$ = Mud heat capacity
$R_m$ = Thermal resistance of mud
$h_p$ = Overall heat transfer coefficient across drill pipe (BTU/ft$^2$ − °F. − hr. − ft.)
$T_A$ = Mud temperature in annulus (°F.) at pipe wall
$T_F$ = Temperature of formation (°F.)
$f_m(T_F)$ = Apparent change in formation temperature (°F.)
$T_B$ = Mud temperature in bore (°F.) at pipe wall
$\xi$ = Overall heat transfer coefficient across the annulus mud (BTU/ft$^2$ °F. − hr. − ft.)
$L_m$ = Thermal path length of the mud (ft.)
$L_s$ = Thermal path length of the steel (ft.)

It may be seen that $R_m = L_m/2\pi r_b \mu$; and $$R_s = L_s/2\pi r_p h_p$$

It is thus axiomatic that $\dot{Q}_{FA} = 2\pi r \mu (T_F - T_A)$ and $\dot{Q}_{AB} = 2\pi r_p h_p (T_A - T_B)$.

It is possible by utilizing Laplace transforms and assuming first that the coupling term between the bore and steel may be neglected and that when there is no heat, storage $\dot{Q}_{FA} = \dot{Q}_{AB}$ to derive the following equation for formation temperature:

$$T_F(t) = (T_A(t) - T_B(t))(r_p h_p)/r\mu + T_A(t)$$

This equation may thus be solved with the available data and a calculated value of $\mu$. It would be an advantage to make this calculation without first deriving $\mu$.

The assumption is thus made that stopping circulation is equivalent to a step function. $T_F(t)$ is a unit step at $T = 0$ and by taking the inverse Laplace transforms:

$$T_F(s) = f_m(T_F)/s, \text{ where}$$
$$f_m(T_F) = T_A(t = \infty) - T_A(t = o)$$

Figure 5:
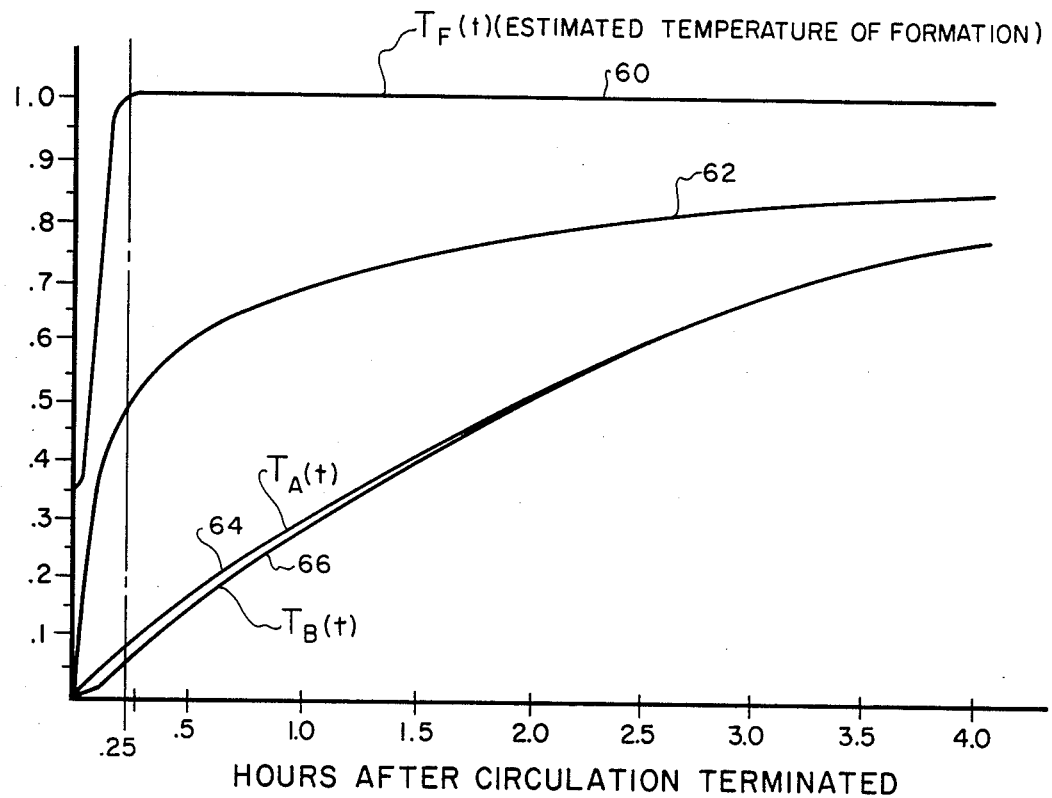
FIG. 5 is a plot of the estimated time response of the differential downhole temperature measurements when the circulation of FIG. 1 is interrupted.

It may thus be seen that:

$$T_A(t) \approx f_m(T_F)[1 - \text{EXP}[-t/R_m C_s]]$$

$$T_B(t) \approx f_m(T_F)[1 - \text{Exp}[-t/R_m C_s] \times [1/(1 - R_s C_m/R_m C_s)] + \text{Exp}[-t/R_s C_m] \times [1/(1 - R_m C_s/R_s C_m)]$$

$$T_A(t) - T_B(t) = f_m(T_F)[(1/((R_m C_s/C_m R_s) - 1)) \times (\text{Exp}[-t/R_m C_s]) - \text{Exp}[-t/R_s C_m])]$$

and the estimate of $T_F$ when allowing heat storage is:

$$\overline{T_F}(t) = (T_A(t) - T_B(t)) \times ((R_m C_s)/C_m R_s) - 1) + T_A(t)$$

$$T_F = (T_A - T_B) \times K_1 + T_A$$

where $K_1 = (R_m C_s/C_m R_s) - 1$. This formulation permits estimation of formation temperature to be plotted against time as shown in FIG. 5.

It may next be seen that to derive the mud thermal conductivity, one may take the derivative of $T_A(T) - T_B(T)$.

$$\left.\frac{d(T_A(t) - T_B(t))}{dt}\right|_{t=0} \approx$$
$$(1/R_s C_m - 1/R_m C_s)[1/((R_m C_s/C_m R_s) - 1)] \times f_m(T_F)$$

Reducing the above equation:

$$\left.\frac{d(T_A(t) - T_B(t))}{dt}\right|_{t=0} \approx f_m(T_F)/(R_m C_s - R_s C_m)$$

and since $R_m C_s >> R_s C_m$ $$\left.\frac{d(T_A(t) - T_B(t))}{dt}\right|_{t=0} = f_m(T_F)/R_m C_s = (2\pi r_b \mu f_m(T_F)/C_s L_m)$$

$$\mu = L_m C_s/2\pi r_b f_m(T_F) \times (T_A(t) - T_B(t))/t|_{t=0}$$

For purposes of example, assume the following parameters for a well and mud circulation properties for a Gulf Coast well:

| | |
|---|---|
| Mud weight, lb/gal, (Wm) | 10.0 |
| Steel density, lb/pt$^3$, (Ws) | 49.0 |
| Drill collar ID, inches, (2r$_1$) | 3.81 |
| Drill collar OD, inches, (2r$_2$) | 7.0 |
| Drill bit size, OD, inches, (2r$_b$) | 8.375 |
| Mud specific heat, BTU/lb$_m$ - °F., ($\bar{c}_m$) | 1.0 |
| Steel specific heat, BTU/lb$_m$ - °F. ($\bar{c}_s$) | .104 |
| Mud thermal conductivity, BTU/ft$^2$ - °F. - hour - ft. ($\mu$) | 1.0 |
| Steel thermal conductivity, BTU/ft$^2$ - °F. - hour - ft. (ep) | 30.0 |
| Path length of mud to the formation, inches (L$_m$) | 3.0 |
| Path length of the steel, inches, (L$_s$) | 1.59 |
| $C_m = \bar{c}_m \times M_m = 1.0 \times (W_m \times 2\pi r_1^2 \times 7.48) = 11.75$ | |
| $C_s = c_s \times M_s = .104 \times (W_s \times 2\pi (r_2^2 - r_1^2)) = 22.11$ | |
| $R_m = L_m/2\pi r_b \mu = .25/2\pi (8.375/24) 1 = .115$ | |
| $R_s = L_s/2\pi r_p h_p = .1325/2\pi \; 3.81/24 \; (30) = .0044$ | |
| $T_m = R_m C_s = (.115) (22.11) = 2.54$ hours | |

It may thus be seen that the formation temperature $T_F$ is approximately equal to $(T_A - T_B) \times 48.8 + T_A$ as plotted in FIG. 5.

Referring specifically now to FIG. 5 and the above example, there is shown the time response of the temperature measurements when the circulation is stopped. Curve 60 represents the formation temperature as calculated from the equation $T_F(t) \approx [T_A(t) - T_B(t)] \times [(R_m C_s/R_s C_m) - 1] + T_A(t)$. From the previous analysis, $(R_m C_s/R_s C_m) - 1 = 48.8$. Curve 62 represents the formation temperature assuming no heat storage, or replacing K, with $R_m/R_s$ which equals 25.7. Curves 64 and 66 represent the annular and bore temperatures from the example above wherein $T_A \approx [1 - \text{EXP}. [-0.3937t]$ and $T_B \approx [1 - 1.0205 \; \text{EXP} [-0.3937t] + 0.0205 \; \text{EXP} [-19.6076t]$. It should be noted that in this example it took over 13.7 hours for the bore and annulus temperatures to reach steady state. However, the time response of the difference is much faster.

Figure 6:
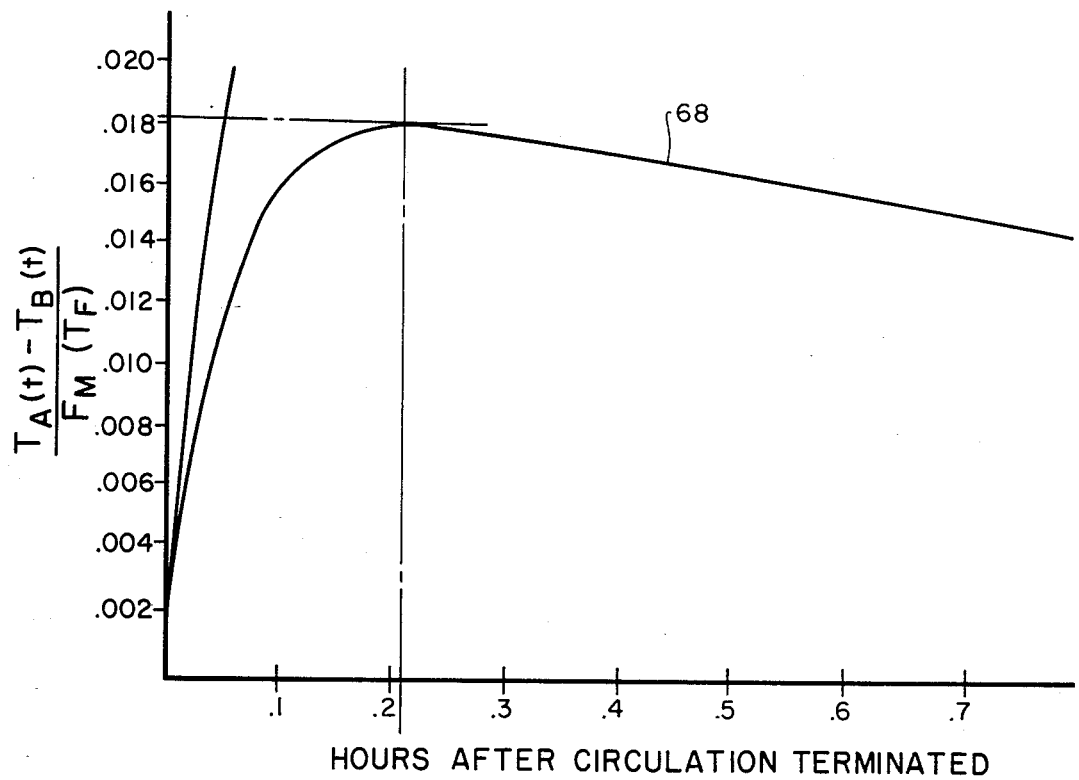
FIG. 6 is a plot of the differential time response of FIG. 5 illustrating the time frame for maximum temperature difference.

Referring now to FIG. 6, the difference of temperature between $T_A(t)$ and $T_B(t)$ is represented by curve 68 and becomes a maximum about 12 minutes after mud circulation stops. By using this maximum difference, the formation temperature can be estimated in accordance with the above equations to provide the top two curves 60 and 62 of FIG. 5. It is then not necessary to wait the prolonged period of time until conventional downhole thermal stabilization to determine formation temperature.

It may thus be seen that the calculation of mud thermal conductivity and formation temperature from mud annulus and bore temperature may be expeditiously performed when circulation of drilling fluids is interrupted. By utilizing the mathematical borehole model as schematically shown in FIG. 4, the requisite data is provided for such calculations. Mud thermal conductivity can thus be calculated immediately after drilling fluid circulation is stopped from the above defined relationship:

$$\mu = \frac{(T_A(t) - T_B(t))}{dt} \times K_1$$

Given the annulus and bore temperature profiles $T_A(t)$ and $T_B(t)$ when standing, formation temperature can be calculated from the above-defined relationship:

$$T_f(t) = \frac{(T_A(t) - T_B(t))r_p \cdot h_p}{r\mu} + T_A(t)$$

As set forth above, the most accurate calculation occurs when $T_B(t)$ and $T_A(t)$ have reached their final values. However, as shown herein, when $T_A(t) - T_B(t)$ is at its maximum, as shown in FIG. 6, this permits an estimate of formation temperature in a shorter period of time.

The foregoing description of the invention has been directed primarily to a particular preferred embodiment in accordance with the requirements of the patent statutes and for purposes of explanation and illustration. It will be apparent, however, to those skilled in the art that many modifications and changes in the specifically described and illustrated apparatus and method may be made without departing from the scope and spirit of the invention. Therefore, the invention is not restricted to the particular form of construction illustrated and described, but covers all modifications which may fall within the scope of the following claims.

It is Applicants' intention in the following claims to cover such modifications and variations as fall within the true spirit and scope of the invention.

We claim:

1. A method of determining the earth formation temperature while drilling a borehole comprising the steps of:

pumping drilling fluid into the borehole through drill pipe to the drill bit and back to the surface along the annulus between the drill pipe and the walls of the borehole to transfer heat to said fluid from earth formations as they are exposed by the drill bit;

interrupting the flow of said fluid inside said drill pipe;

measuring the temperatures of said fluid inside said drill pipe and in said annulus during said interruption of flow;

creating a timed array set of said measured temperatures of said fluid during said interruption of flow and drilling;

determining, by a plurality of calculations, the thermal conductivity of said fluid as a function of the temperature differential of said fluid in said pipe and annulus;

compensating in said calculations for the fluid flow caused by thermal effects of the cuttings slip in the annulus during said flow interruption; and determining the earth formation temperature in said borehole as a function of said fluid thermal conductivity and the temperature differential of said fluid in said pipe and annulus.

2. The method of determining the earth formation temperature as set forth in claim 1 wherein the step of determining said thermal conductivity of said fluid includes the step of calculating a fluid path relationship between the path length of fluid to said formation and heat capacity of steel to the area of the pipe and apparent change in formation temperature.

3. The method of determining the earth formation temperature as set forth in claim 1 wherein the step of determining the thermal conductivity of said fluid includes the step of calculating a capacitance relationship between the thermal resistivity of said fluid and steel and the heat capacity of said fluid and steel, wherein said fluid comprises drilling mud and cuttings.

4. The method of determining the earth formation temperature as set forth in claim 3 wherein the step of calculating said capacitance relationship includes the step of determining the ratio of fluid resistivity and steel capacitance to fluid capacitance and steel resistivity.

5. The method of determining the earth formation temperature as set forth in claim 1 wherein the step of determining the earth formation temperature includes the step of establishing the maximum temperature differential of said fluid in said pipe and annulus following said step of interrupting said flow.

6. The method of determining the earth formation temperature as set forth in claim 5 wherein the step of determining the earth formation temperature includes the step of calculating an annulus relationship between the radius of said pipe, its heat transfer coefficient, the radius of the borehole and thermal conductivity of said fluid.

7. The method of determining the earth formation temperature as set forth in claim 6 wherein the step of calculating said annulus relationship includes the step of determining the ratio of pipe radius and its heat transfer coefficient to borehole radius and fluid thermal conductivity.

8. The method of determining the earth formation temperature as set forth in claim 5 wherein the step of establishing the maximum fluid temperature differential includes calculating the ratio of said maximum temperature differential to the radius of the borehole and fluid thermal conductivity to pipe radius and its heat transfer coefficient.

* * * * *